United States Patent
Hara et al.

(10) Patent No.: US 7,486,809 B2
(45) Date of Patent: Feb. 3, 2009

(54) CAPACITANCE DETECTION DEVICE, FINGERPRINT SENSOR, BIOMETRIC AUTHENTICATION DEVICE, AND METHOD FOR SEARCHING CAPACITANCE DETECTION CONDITION

(75) Inventors: Hiroyuki Hara, Chino (JP); Mitsutoshi Miyasaka, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 762 days.

(21) Appl. No.: 11/041,265

(22) Filed: Jan. 25, 2005

(65) Prior Publication Data

US 2005/0179446 A1 Aug. 18, 2005

(30) Foreign Application Priority Data

Feb. 17, 2004 (JP) ............................. 2004-040375

(51) Int. Cl.
*G06K 9/00* (2006.01)
(52) U.S. Cl. ..................... 382/124; 382/125; 324/658
(58) Field of Classification Search ................ 382/124, 382/125; 324/658
See application file for complete search history.

(56) References Cited

U.S. PATENT DOCUMENTS

| | | | |
|---|---|---|---|
| 4,353,056 A | | 10/1982 | Tsikos |
| 5,325,442 A | * | 6/1994 | Knapp .......................... 382/124 |
| 5,963,679 A | * | 10/1999 | Setlak .......................... 382/312 |
| 5,987,156 A | * | 11/1999 | Ackland et al. ............. 382/125 |
| 6,538,456 B1 | | 3/2003 | Dickinson et al. |
| 2001/0026635 A1 | | 10/2001 | Jung |

FOREIGN PATENT DOCUMENTS

| | | |
|---|---|---|
| JP | A 11-118415 | 4/1999 |
| JP | A 2000-346608 | 12/2000 |
| JP | A 2001-56204 | 2/2001 |
| JP | A 2001-133213 | 5/2001 |
| JP | A-2001-525067 | 12/2001 |
| JP | A 2003-254706 | 9/2003 |
| JP | A-2003-295982 | 10/2003 |
| JP | A 2004-89675 | 3/2004 |

\* cited by examiner

*Primary Examiner*—Matthew C Bella
*Assistant Examiner*—John B Strege
(74) *Attorney, Agent, or Firm*—Oliff & Berridge, PLC

(57) ABSTRACT

Aspects of the invention can provide a fingerprint sensor for searching for a detection condition in a short period of time in order to read information of ridges and valleys of a fingerprint as changes in capacitance. The fingerprint sensor of the invention can include a plurality of capacitance detection circuits that output a detection signal having ridge/valley information of a fingerprint based on capacitance formed between the sensor and a fingertip surface, a fingerprint detection part in which the plurality of capacitance detection circuits are arranged to intersect with one another in a row direction and a column direction, a plurality of scanning lines, a scanning line driver for driving the scanning line, a plurality of data lines, a data line driver for driving the data line, and search device for searching for a detection condition of ridge/valley information by changing detection conditions of the ridge/valley information in a state that the plurality of capacitance detection circuits arranged along any one of the plurality of scanning lines are being selected.

18 Claims, 14 Drawing Sheets

PREPARATION PERIOD
(RESET SIGNAL RSTX=Low    ADJUSTMENT CONTROL SIGNAL  ACC=Low)

FINGERPRINT DETECTION PERIOD
(RESET SIGNAL RSTX=High    ADJUSTMENT CONTROL SIGNAL  ACC=High)

PERIODS A1, A2 (RESET SIGNAL RSTY=Low)
PERIOD B (RESET SIGNAL RSTY=High)

PREPARATION PERIOD
(RESET SIGNAL RSTY=Low ADJUSTMENT CONTROL SIGNAL ACC=Low)

FINGERPRINT DETECTION PERIOD
(RESET SIGNAL RSTY=High ADJUSTMENT CONTROL SIGNAL ACC=High)

CAPACITANCE DETECTION DEVICE, FINGERPRINT SENSOR, BIOMETRIC AUTHENTICATION DEVICE, AND METHOD FOR SEARCHING CAPACITANCE DETECTION CONDITION

BACKGROUND

Aspects of the invention can relate to a capacitance detection technique for reading the surface composition of an inspecting object, such as a fingerprint, having minute ridges and valleys as changes in capacitance.

With a related art fingerprint sensor, a detection circuit for reading out information of ridges and valleys of a fingerprint is formed on a single-crystalline silicon substrate. See, for example, Japanese Unexamined Patent Publication Nos. 11-118415, 2000-346608, 2001-56204, and 2001-133213. However, since a fingerprint sensor needs to have a size of around 20 mm×20 mm as required for its use, the fingerprint sensor formed on a single-crystalline silicon becomes costly. To solve this problem, a fingerprint sensor using a thin film metal-insulator-semiconductor (MIS) device has been proposed. See, for example, Japanese Unexamined Patent Publication No. 2003-254706. By using a thin film MIS device, a fingerprint sensor can also be formed on a glass substrate or a plastic substrate.

SUMMARY

However, with related art types of fingerprint sensors, every time a fingerprint is detected, optimal values such as a reference potential change as various external factors, such as temperature, humidity, skin condition, and finger pressure change. Therefore, the detection condition needs to be reset so as to obtain new optimal values. In a search for an optimal detection condition, also, a related art fingerprint sensor reads out information from all the capacitance detection circuits arranged in a fingerprint detection part much in the same manner as when reading out ridges and valleys of a fingerprint. Therefore, it takes considerable time to search for the detection condition.

Hence, aspects of the invention aims to provide a capacitance detection device that can search for a detection condition in a short period of time in order to read a surface composition of an inspecting object having minute ridges and valleys as changes in capacitance, a fingerprint sensor, and a biometric authentication device, and a method for searching for the capacitance detection condition.

An exemplary capacitance detection device of the invention can include a plurality of capacitance detection circuits which output a detection signal having ridge/valley information of a surface of an inspecting object based on capacitance formed between the device and the surface of the inspecting object, a detection part in which the plurality of capacitance detection circuits are arranged in a row direction and a column direction intersecting with each other; and a search device for searching for a detection condition of the ridge/valley information by changing detection conditions of the ridge/valley information in a state that a capacitance detection circuit arranged in at least one of the plurality of rows or at least one of the plurality of columns is being selected. When a plurality of capacitance detection circuits are arranged in a row direction and a column direction in the detection part, an optimal detection condition of the ridge/valley information can be searched for in a short period of time by driving the capacitance detection circuit arranged in at least one of the plurality of rows or at least one of the plurality of columns so as to read the ridge/valley information of the surface of the inspecting object.

An exemplary capacitance detection device of the invention may further be composed of a select device for selecting a capacitance detection circuit arranged in at least one of the plurality of rows or at least one of the plurality of columns. The select device can be obtained only by adding a simple circuit or the like.

The capacitance detection device of the invention may further be composed of a row select device for successively selecting per each row a plurality of capacitance detection circuits arranged in a row direction and a column select device for successively selecting per each column a plurality of capacitance detection circuits arranged in a column direction. The row select device or the column select device can successively select a capacitance detection circuit arranged in each row or each column and successively stops the selection when a capacitance detection circuit arranged in a specific row or a specific column has been selected. The search device searches for a detection condition of the ridge/valley information by changing detection conditions of the ridge/valley information in a state that a capacitance detection circuit arranged in the specific row or the specific column is being selected. By driving the row select device and the column select device as thus described, a capacitance detection circuit arranged in a specific row or column can be selected, whereby the search for a detection condition of ridge/valley information becomes possible.

Here, it is preferable that the row or the column to be selected when searching for the detection condition of the ridge/valley information be the row or the column that is located near the center of a detection part. When the row or the column to be selected when searching for the detection condition of the ridge/valley information is located near the center of the detection part, the capacitance detection circuit selected when searching for the detection condition of the ridge/valley information can come close to the surface of the inspecting object enough for the capacitance to be formed between the circuit and the surface of the inspecting object.

The capacitance detection device of the invention can include a plurality of capacitance detection circuits which output a detection signal having ridge/valley information of a surface of an inspecting object based on capacitance formed between the device and the inspecting object, a detection part in which the plurality of capacitance detection circuits are arranged in a row direction and a column direction intersecting with each other, a plurality of scanning lines for successively selecting per each row a plurality of capacitance detection circuits arranged in a row direction, a scanning line driver for driving the scanning line, a data line for transmitting a detection signal output from a plurality of capacitance detection circuits arranged in a column direction, a data line driver for driving the data line, and a search device for searching for a detection condition of the ridge/valley information by changing detection conditions of the ridge/valley information in a state that a plurality of capacitance detection circuits arranged along at least one of the plurality of scanning lines are being selected. When a plurality of capacitance detection circuits are arranged in a row direction and a column direction in the detection part, an optimal detection condition of ridge/valley information can be searched for by driving the plurality of capacitance detection circuits arranged along at least one scanning line so as to read the ridge/valley information of the surface of the inspecting object.

The capacitance detection device of the invention include a plurality of capacitance detection circuits which output a detection signal having ridge/valley information of a surface of an inspecting object based on capacitance formed between the device and the inspecting object, a detection part in which the plurality of capacitance detection circuits are arranged in a row direction and a column direction intersecting with each other, a plurality of scanning lines for selecting per each row a plurality of capacitance detection circuits arranged in a row direction; a scanning line driver for driving the scanning line, a data line for transmitting a detection signal output from a plurality of capacitance detection circuits arranged in a column direction, a data line driver for driving the data line, and a search device for searching for a detection condition of the ridge/valley information by changing detection conditions of the ridge/valley information in a state that a plurality of capacitance detection circuits arranged along at least one of the plurality of the data lines are being selected. When a plurality of capacitance detection circuits are arranged in a row direction and a column direction in the detection part, an optimal detection condition of the ridge/valley information can be searched for in a short period of time by driving the plurality of capacitance detection circuits arranged along at least one data line so as to read the ridge/valley information of the surface of the inspecting object.

An exemplary fingerprint sensor of the invention can include the capacitance detection device of the invention and has a composition for reading ridge/valley information of a fingerprint. By reading the ridge/valley information of a fingertip surface as a surface of an inspecting object, fingerprint information can be obtained.

The biometric authentication device of the invention is composed of the fingerprint sensor of the present invention. Here, a biometric authentication device means a device having a function to conduct authentication by using fingerprint information as biometric information. The biometric authentication device includes various card media such as an IC card, a cash card (bank card), a credit card, and an ID card, and further includes various security systems such as an authentication device used for electronic commerce, a device for controlling the entering and exiting of a room, an authentication device used for a computer terminal device.

The method for searching for a capacitance detection condition of the invention can be a method wherein the capacitance detection condition is searched for by driving a capacitance detection device in which a plurality of capacitance detection circuits that output a detection signal having ridge/valley information of a surface of an inspecting object based on capacitance formed between the device and the inspecting object are arranged in a plurality of rows and a plurality of columns. The method can include the steps of selecting a capacitance detection circuit arranged in at least one of the plurality of rows or at least one of the plurality of columns, and searching for a detection condition of the ridge/valley information by changing detection conditions of the ridge/valley information in a state that the capacitance detection circuit is being selected. When a plurality of capacitance detection circuits are arranged in a row direction and a column direction in the detection part, an optimal detection condition of ridge/valley information can be searched for in a short period of time by driving the capacitance detection circuit arranged in at least one of the plurality of rows or at least one of the plurality of columns so as to read the ridge/valley information of the surface of the inspecting object.

The method of searching for the capacitance detection condition of the invention further includes the steps of successively selecting a capacitance detection circuit arranged in each row or each column and successively stopping the selection when a capacitance detection circuit arranged in a specific row or a specific column has been selected, and searching for a detection condition of the ridge/valley information by changing detection conditions of the ridge/valley information in a state that a capacitance detection circuit arranged in a specific row or a specific column is being selected. By driving the row select device and the column select device as thus described, a capacitance detection circuit arranged in a specific row or column can be selected, whereby the search for a detection condition of ridge/valley information becomes possible.

In the method for searching for a capacitance detection condition of the invention, a row or a column to be selected when searching for the detection condition of the ridge/valley information is a row or a column that is located near the center of the detection part. When the row or the column to be selected when searching for the detection condition of the ridge/valley information is located near the center of a detection part, the capacitance detection circuit selected when searching for the detection condition of the ridge/valley information can come close to the surface of the inspecting object enough for capacitance to be formed between the circuit and the surface of the inspecting object.

According to the present invention, when a plurality of capacitance detection circuits are arranged in a row direction and a column direction in the detection part, an optimal detection condition of the ridge/valley information can be searched for in a short period of time by driving the capacitance detection circuit arranged in at least one of the plurality of rows or at least one of the plurality of columns so as to read the ridge/valley formation of the surface of the inspecting object.

BRIEF DESCRIPTION OF THE DRAWINGS

The invention will be described with reference to the accompanying drawings, wherein like numerals reference like elements, and wherein.

DETAILED DESCRIPTION OF EMBODIMENTS

Figure 4:
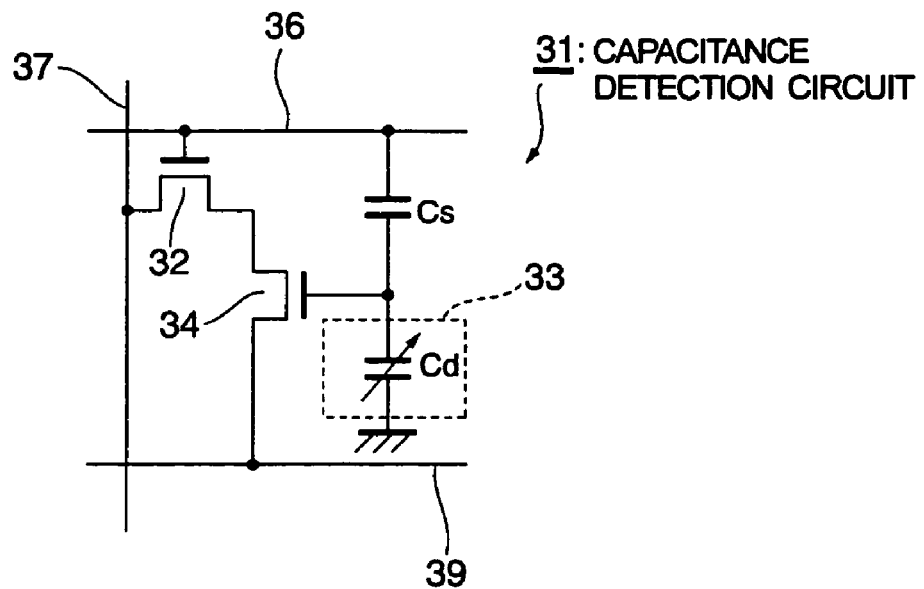
FIG. 4 is a diagram showing a circuit diagram of a capacitance detection circuit.

In the following, the fingerprint sensor (the capacitance detection device) of the first exemplary embodiment of the invention will be described with reference to the accompanying drawings. FIG. 4 is a diagram showing an exemplary circuit diagram of a capacitance detection circuit 31 which reads ridge/valley information of a fingerprint of a person to be inspected as a change in capacitance and converts the information into a current signal. The capacitance detection circuit 31 is composed of a select transistor 32 for selecting the detection circuit 31, a capacitance 33 to be formed between a fingertip of the inspected and the sensor electrode, a signal-amplifying transistor 34 for amplifying a detection signal having ridge/valley information of a fingerprint based on minute capacitance changes in the capacitance 33, a scanning line 36 for transmitting a signal for carrying out an open/close control of the select transistor 32, a data line 37 for transmitting the detection signal, a low-potential power supply line 39 taking a ground potential Vss of the signal-amplifying transistor 34, and standard capacitance Cs having a fixed capacitive value. When a capacitive value of the capacitance 33 is Cd, the detecting capacitance Cd is determined corresponding to the distance between the ridges and valleys of the fingerprint of the inspected and the sensor electrode (see FIG. 8).

In the above-described composition, when a logical signal in high level is output onto the scanning line 36 and the select transistor 32 is shifted to an open state, a detection current determined by the gate potential of the signal-amplifying transistor 34 flows to the data line 37. This detection current can include the ridge/valley information of a fingerprint. The gate potential of the signal-amplifying transistor 34 is determined by capacitance ratios of a parasitic capacitance Ct (not shown) of the signal-amplifying transistor 34, the standard capacitance Cs, and the detecting capacitance Cd. For instance, when a fingertip of a person to be inspected approaches the sensor electrode, and when the ridge part of the fingerprint comes close to the sensor electrode, the detecting capacitance Cd becomes sufficiently large relative to the parasitic capacitance Ct and the standard capacitance Cs, and thus, the gate potential of the signal-amplifying transistor 34 becomes close to the ground potential Vss. As a result, the signal-amplifying transistor 34 turns to near-off state, and an extremely weak detection current flows between the source and the drain of the signal-amplifying transistor 34. On the other hand, when the valley part of the fingerprint comes close to the sensor electrode, the detecting capacitance Cd becomes sufficiently small relative to the parasitic capacitance Ct and the standard capacitance Cs, and, thus, the gate potential of the signal-amplifying transistor 34 becomes close to the potential of the scanning line 36. When the scanning line 36 is in active state, the potential of the scanning line 36 is a high potential Vdd. As a result, the signal-amplifying transistor 34 shifts to near-on state, and thus, a detection current that is larger than the above-mentioned weak current flows between the source and the drain of the signal-amplifying transistor 34. Here, since the source terminal of the signal-amplifying transistor 34 is connected to the low-potential power supply line 39, the direction in which the detection current flows in the signal-amplifying transistor 34 shifts to a direction in which the detection current flows from the data line 37 to the low-potential power supply line 39. This means that the detection current having the ridge/valley information of the fingerprint of the person to be inspected is output so as to flow from an external circuit to the capacitance detection circuit 31.

Figure 8:
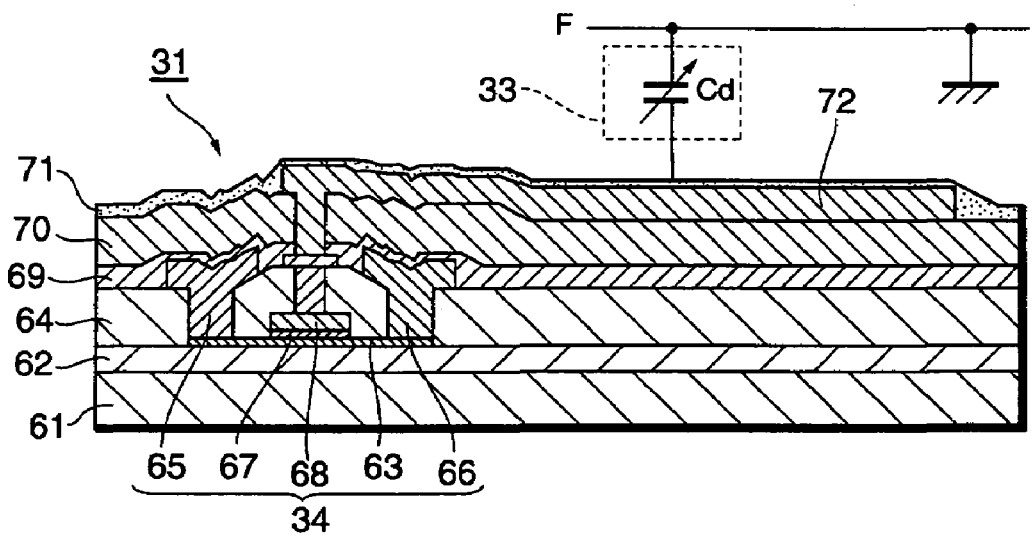
FIG. 8 is a cross-sectional diagram of the capacitance detection circuit.

FIG. 8 is a diagram showing a cross-sectional view of a composition of the capacitance detection circuit 31 mainly including a sensor electrode. As shown in this diagram, in the capacitance detection circuit 31, there are formed the signal-amplifying transistor 34 for outputting a detection signal having ridge/valley information of a fingerprint and a sensor electrode 72 for forming the capacitance 33 between the sensor electrode 72 and a fingertip F of the person to be inspected. The signal-amplifying transistor 34 is a transistor including a gate electrode 68, gate insulating film 67, a multi-crystalline silicon layer (an active layer) 63, a source electrode 65, and a drain electrode 66. The capacitance 33 is variable capacitance in that the capacitive value changes depending on a ridge/valley pattern of a fingerprint. The potential of the fingertip F is set as the standard potential. The sensor electrode 72 is connected with the gate electrode 68 and transmits the change in the detecting capacitance Cd created by the ridge and valley of the fingerprint to the signal-amplifying transistor 34, whereby the change in capacitance can be sensed because of the amplification effect of the drain current flowing through the channel.

Figure 1:
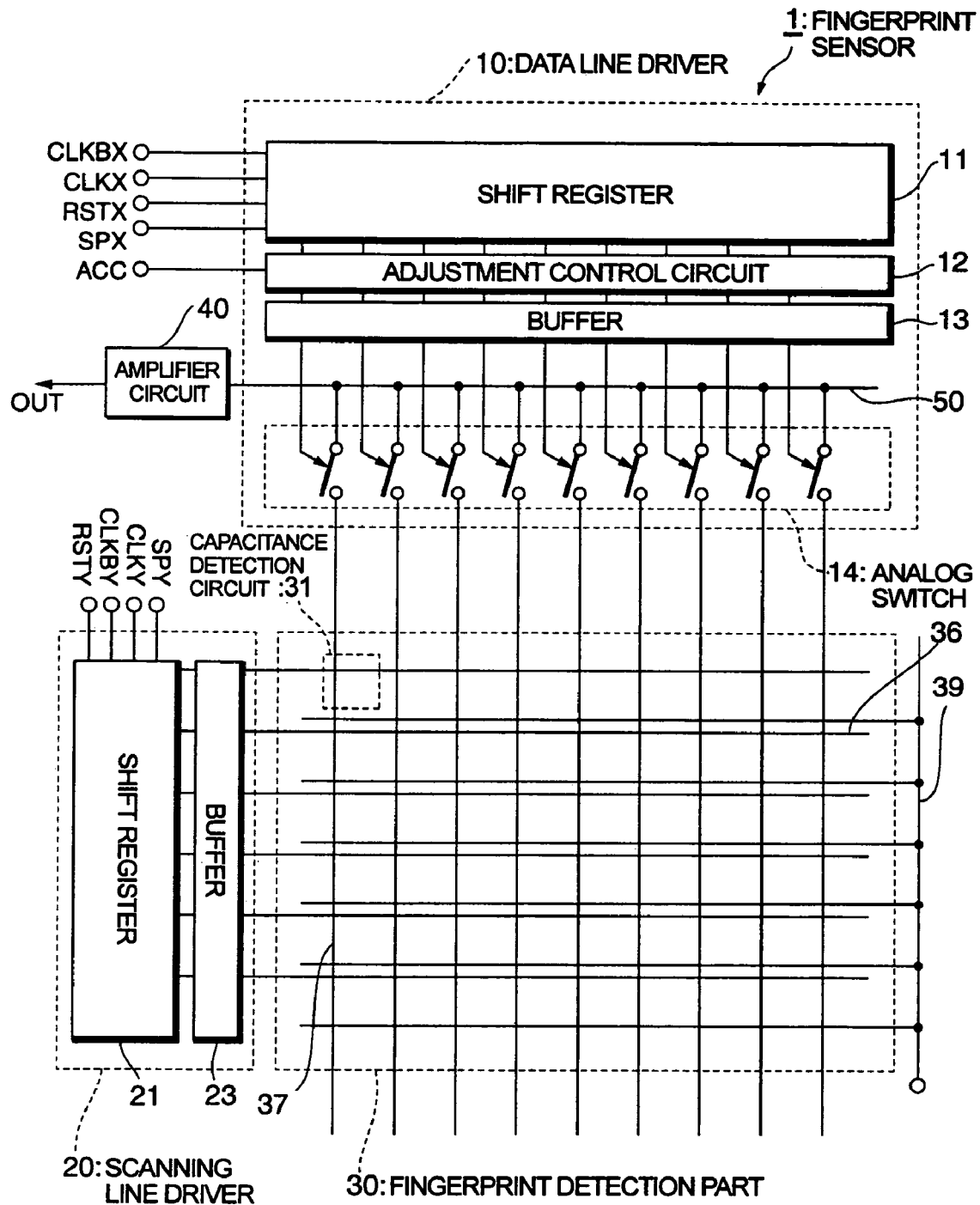
FIG. 1 is a diagram showing a circuit diagram of a fingerprint sensor of a first exemplary embodiment.

FIG. 1 shows an exemplary circuit diagram of the fingerprint sensor 1. The fingerprint sensor 1 mainly includes a data line driver 10 for selecting the data lines 37, a scanning line driver 20 for selecting the scanning lines 36, a fingerprint detection part (an active matrix part) 30 in which the above-described capacitance detection circuits 30 are arranged in a matrix, and an amplifier circuit 40 for amplifying the detection signals output from the capacitance detection circuits 31. In the fingerprint detection part 30, the capacitance detection circuits 31 are arranged in a matrix (n rows×m columns), wherein n scanning lines 36 and n low-potential power supply lines 39 are wired in a row direction, while m data lines 37 are wired in a column direction. The data line driver 10 is composed of a shift resistor 11 which generates a timing signal for selecting the data line 37 when successively driven at an analog point, a buffer 13, the analog switch 14 for selecting the data lines 37, and further, an adjustment control circuit 12 for selecting only a specific data line which is predetermined at a time of searching for fingerprint detection conditions. The scanning line driver 20 is composed of the buffer 23 and the shift resistor 21 which generates a timing signal for successively selecting the scanning line 36.

Here, CLKX denotes a clock signal used as a timing reference when selecting the data line 37; CLKBX, an inverted signal of CLKX; RSTX, a reset signal of the data line driver 10; SPX, a start pulse signal of the data line driver 10; ACC, an adjustment control signal for selecting a specific data line 37 when searching for a fingerprint detection condition; CLKY, a clock signal used as a timing reference when selecting the scanning lines 36; CLKBY, an inverted signal of CLKY; RSTY, a reset signal of the scanning line driver 20; SPY, a start pulse signal of the scanning line driver 20; and OUT, a fingerprint detection signal amplified in the amplifier circuit 40. When conducting a fingerprint detection, the reset signal RSTX and the adjustment control signal ACC turn to high level, and the data line driver 10 and the scanning line driver 20 conduct a normal shift resistor operation. The scanning line driver 20 synchronizes with the clock signal CLKY, successively transmitting the input information of the start pulse signal SPY. On the other hand, the data line driver 10 times with the operation of the scanning line driver 20, synchronizes with the clock signal CLKX, and successively transmits the input information of the start pulse SPX. Thus, the capacitance detection circuits 31 arranged inside the fingerprint detection part 30 are selected one by one per each row and each column, whereby the fingerprint detection operation is conducted.

Additionally, the terms row direction and column direction in the specification are used, for convenience, to differentiate the arranged directions of the capacitance detection circuits 31 arranged in a matrix. Therefore, these directions may also be called a first direction and a second direction which intersect with each other. Further, the data line driver 10 is sometimes called a column select device, and the scanning line driver 20, a row select device.

Figure 2:
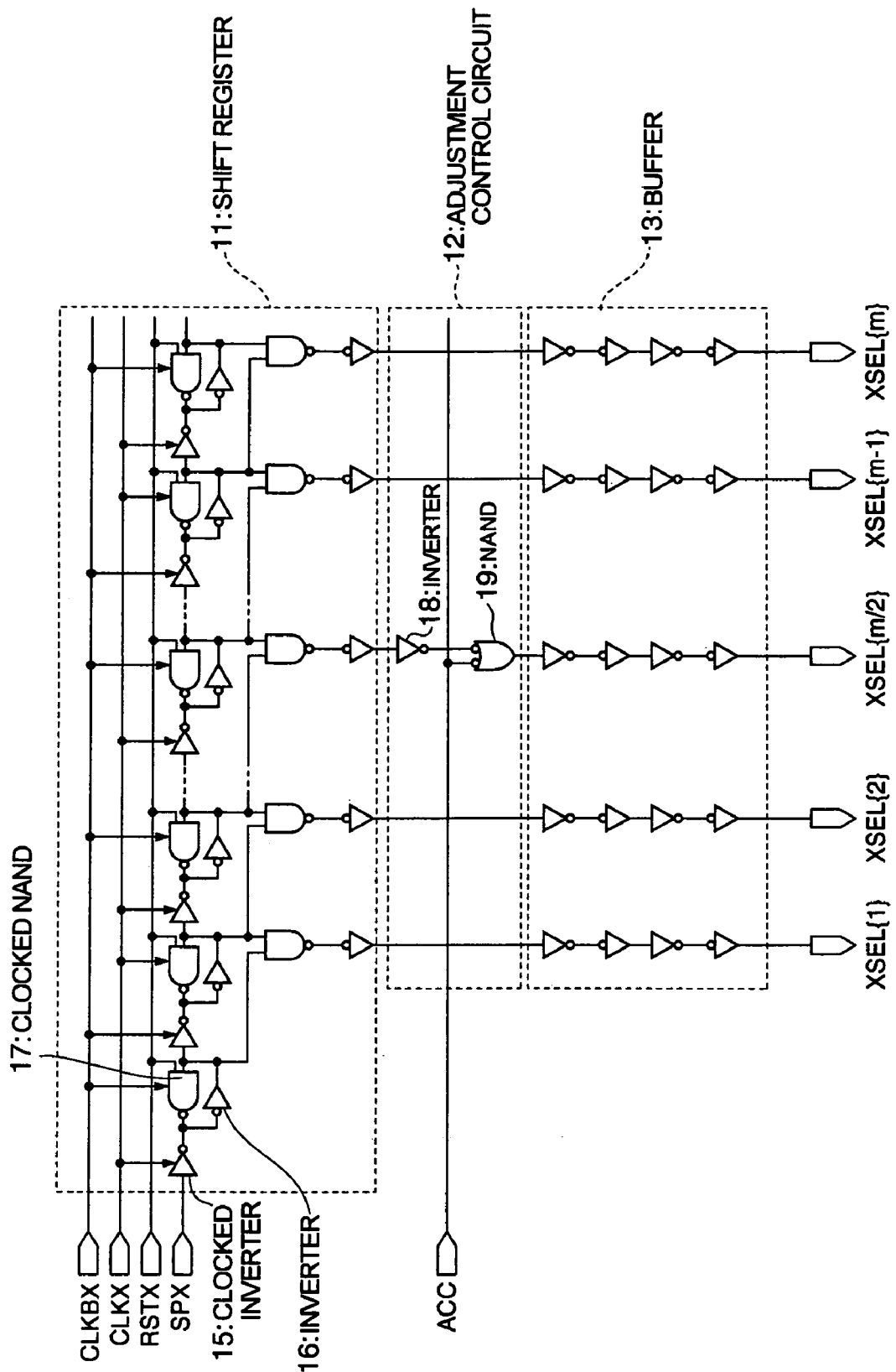
FIG. 2 is a diagram showing a circuit diagram of a data line driver.
Figure 5:
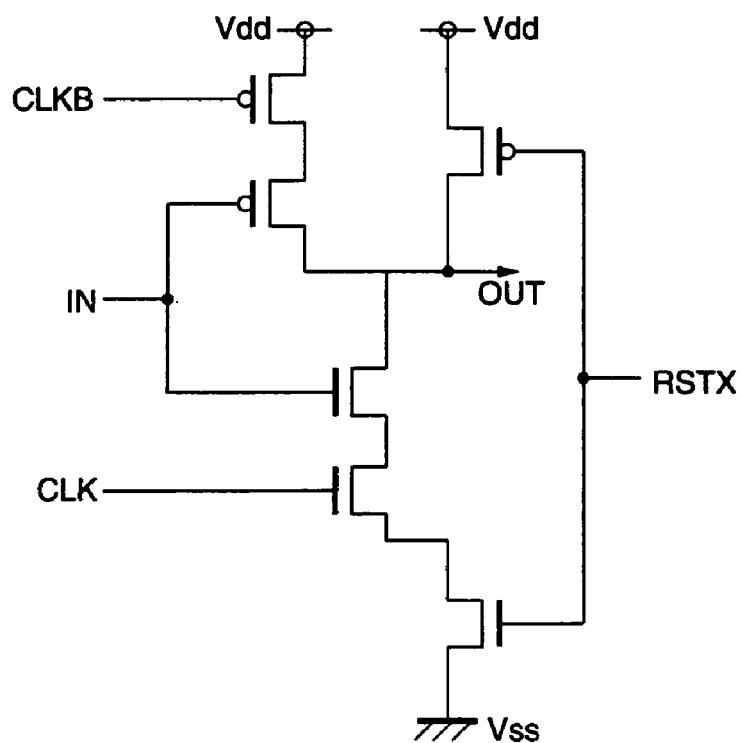
FIG. 5 is an exemplary diagram showing a circuit diagram of a clocked NAND circuit.

FIG. 2 shows a detailed circuit diagram of the data line driver 10. As shown in the diagram, the shift register 11 is composed of a clocked inverter 15 which controls the receiving of a pulse signal that is input from a stage preceding the shift resistor, an inverter 16 that inverts the output of the clocked inverter 15, and a clocked NAND circuit 17 which controls the inversion of the output of the inverter 16 (to a stage subsequent to the shift resistor). The adjustment control circuit 12 is composed of an inverter 18 which inverts the output from the shift register 11 and of a NAND circuit 19 which takes the NAND of the output signal of the inverter 18 and the adjustment control signal Acc and then outputs the signal to the subsequent buffer 13. From XSEL{1} to XSEL{m} are buffer outputs for controlling the opening and closing of m analog switches 14. The clocked NAND circuit 17 mentioned here has a circuit diagram shown in FIG. 5.

Figure 3:
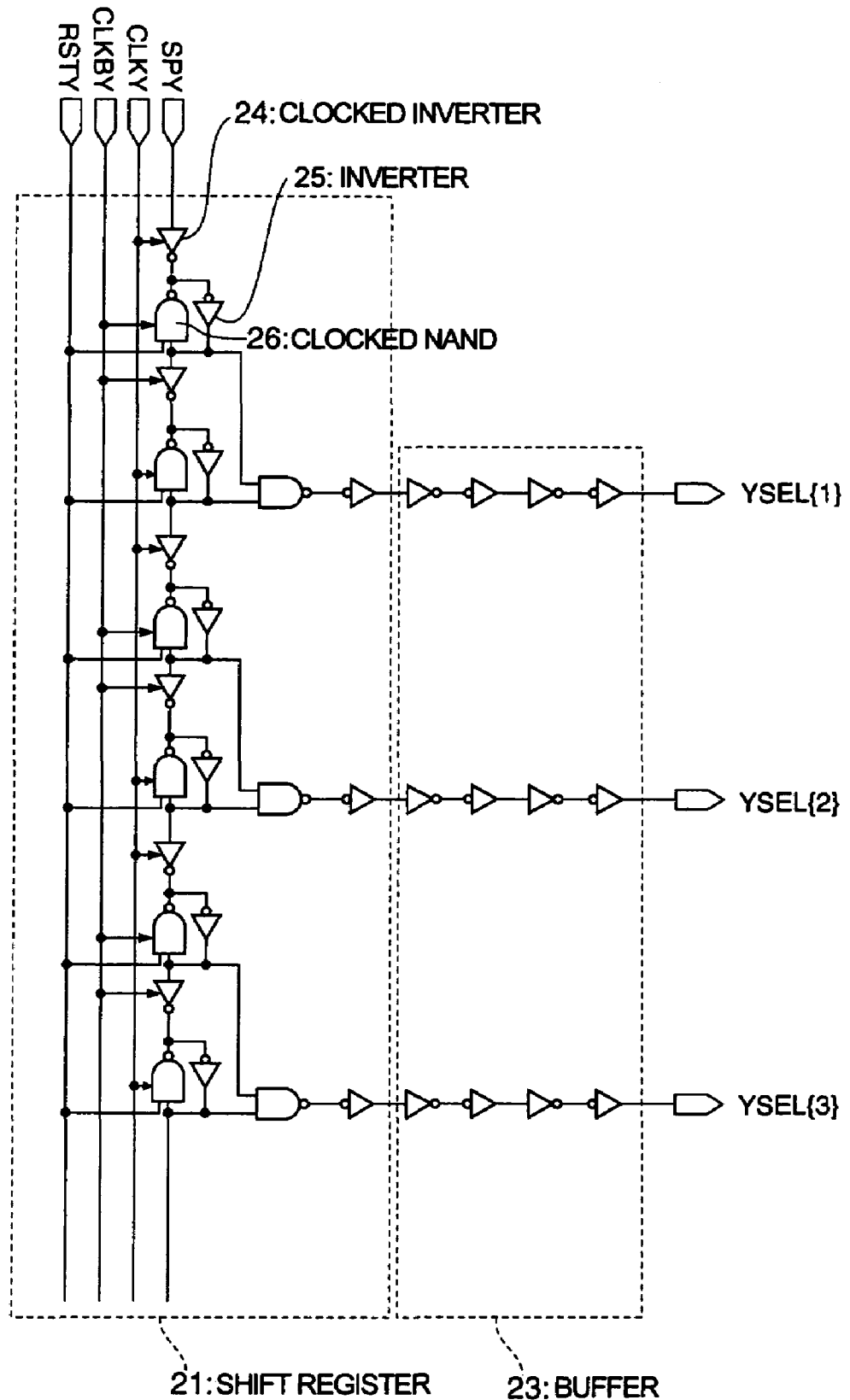
FIG. 3 is a diagram showing a circuit diagram of a scanning line driver.

FIG. 3 shows a detailed circuit diagram of the scanning line driver 20. As shown in the diagram, a shift register 21 is composed of a clocked inverter 24 which controls the receiving of a pulse signal coming from a stage preceding the shift resistor, an inverter 25 which inverts the output of the clocked inverter 24, and a clocked NAND circuit 26 which controls the inversion of the output of the inverter 25 (to a stage subsequent to the shift resistor). From YSEL{1} to YSEL{n} are buffer outputs to be output to the scanning line 36. The clocked NAND circuit 26 mentioned here has the same circuit diagram as the one shown in FIG. 5 (with CLKX, CLKBX, and RSTX being replaced by CLKY, CLKBY, and RSTY, respectively).

Figure 6:
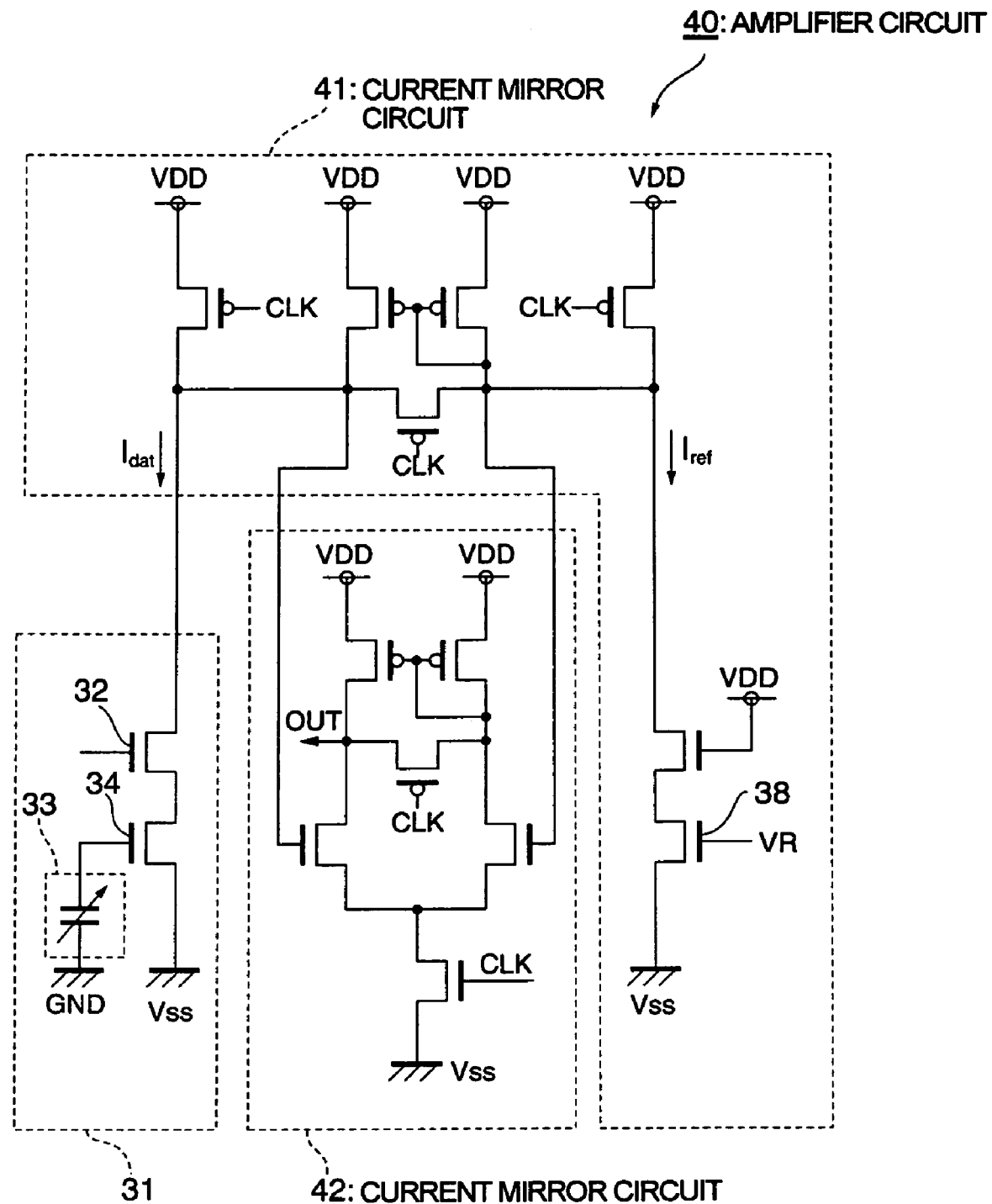
FIG. 6 is an exemplary diagram showing a circuit diagram of an amplifier circuit.

FIG. 6 shows an exemplary circuit diagram of the amplifier circuit 40. The amplifier circuit 40 is a circuit for amplifying the detection signal of the capacitance detection circuit 31 and is composed of a preceding current mirror circuit 41 and a subsequent current mirror circuit 42. In the preceding current mirror circuit 41, a fixed reference current $I_{ref}$ output from the transistor 38, wherein the gate potential is maintained at a reference potential VR, is compared with a detection current $I_{dat}$ output from the signal-amplifying transistor 34. The subsequent current mirror circuit 42 outputs a detection signal OUT obtained by amplifying the difference between the reference current $I_{ref}$ and the detection current $I_{dat}$. By comparing this detection signal OUT and a signal level of a predetermined specific threshold value, fingerprint information made of digit data can be obtained. Since the value of the reference current $I_{ref}$ is determined by the reference potential VR, it becomes possible to increase or decrease the difference between the reference current $I_{ref}$ and the detection current $I_{dat}$ by adjusting the reference potential VR, whereby the contrast in a fingerprint can be adjusted. Additionally, in the same diagram, the CLK signal is identical with the pulse signal which is input into the shift register 11 and is in synchronization with a switching timing of an analog switch 14.

Figure 7:
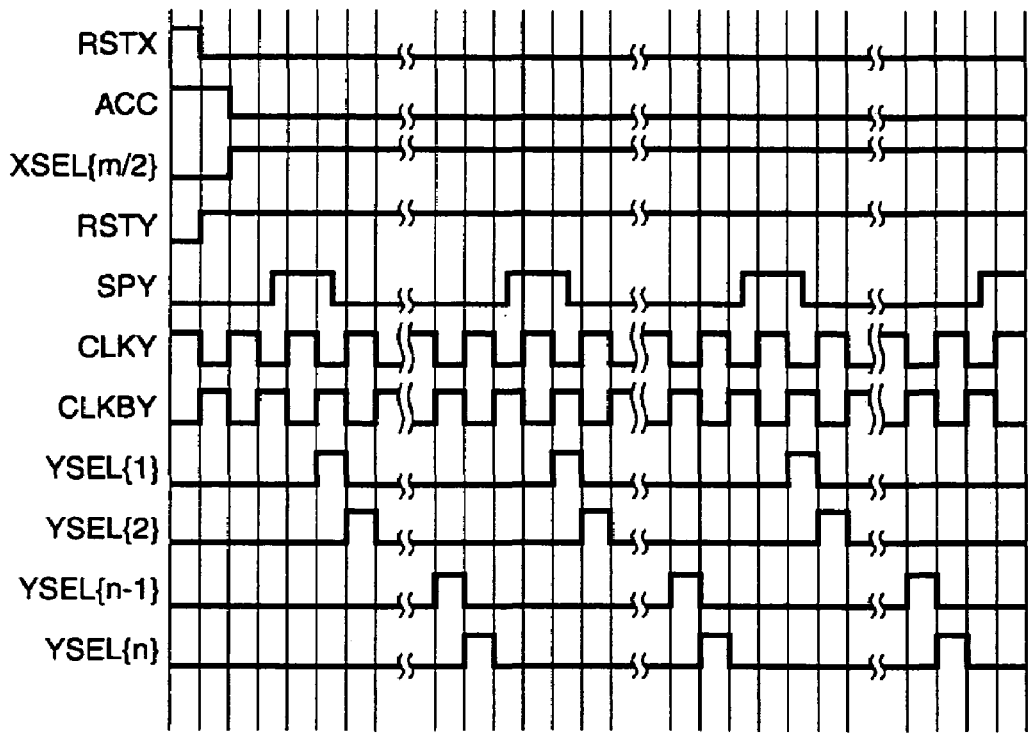
FIG. 7 is a timing diagram of the first exemplary embodiment.

FIG. 7 illustrates a timing diagram in a period for preparing for the search for the fingerprint detection condition. During this preparation period, the reset signal RSTX to be input into the data line driver 10 is set to low level. Consequently, all the outputs of the clocked NAND included in the shift register 11 which composes the data line driver 10 turn to high level, and all the outputs of the shift resistor 11 in every stage turn to low level. While keeping this state and turning the adjustment control signal ACC to low level, only the buffer output in a stage in which the NAND circuit 19 of the adjustment control circuit 12 is provided (in FIG. 2, XSEL{m/2}) turns to high level, and only the corresponding analog switch 14 turns to select state. Other analog switches 14 turn to non-select state. Consequently, only one specific data line 37 turns active. Thus, the adjustment control circuit 12 functions as a selection means for selecting the specific data line 37. On the other hand, as regards the scanning line driver 20, the scanning line driver 20 turns the reset signal RSTY to high level in the same manner as in the common fingerprint detection and, starting with the falling of the start pulse SPY, successively selects the scanning lines 36 by synchronizing with the clock signal CLKY and the inverted clock signal CLKBY. This diagram shows a case in which the start pulse SPY is input three times, which means that the above-mentioned specific data line 37 is scanned three times. In one scanning, a current corresponding to the ridge/valley information of a fingerprint flows in n capacitance detection circuits 31 that are connected with the specific data line 37.

Per each scanning, the operation of the fingerprint detection is conducted under various detection conditions in order to search for an optimal fingerprint detection condition. More precisely, the reference potential VR in the amplifier circuit 40 is swept from Vdd to Vss, while distinguishing the detection sensitivity of the capacitance detection circuit 31 at that time based on the detection signal OUT. In other words, if the reference potential VR is equal to Vss, the transistor 38 turns to near-off state, and the reference current $I_{ref}$ reaches close to its minimum value, whereby all the detection signals OUT output from every capacitance detection circuit 31 turn to high level. On the contrary, if the reference potential VR is equal to Vdd, the transistor 38 turns to near-on state, and the reference current $I_{ref}$ reaches close to its maximum value, and thus, all the detection signals OUT output from every capacitance detection circuit 31 turn to low level. The optimal value of the reference potential VR is in the range of Vss to Vdd. The optimal value of the reference potential VR varies each time a fingerprint is detected, depending on various external factors, such as temperature, humidity, skin condition, and pressure from a finger. Therefore, every time a fingerprint is detected, detection accuracy can be enhanced by searching for the optimal fingerprint detection condition (the value of the reference potential VR, for example) as a preparation prior to the fingerprint detection. The data line driver 10, the scanning line driver 20, and the amplifier circuit 40 operate as the device for searching for the fingerprint detection condition.

Upon finishing the search for the fingerprint detection condition as thus described, the reset signal RSTX and the adjustment control signal ACC are turned to high level in order to carry out the fingerprint detection. This fingerprint detection is conducted based on the optimal fingerprint detection condition searched for as the preparation prior to the fingerprint detection.

Additionally, it is preferable that the data line 37 selected at a time of searching for the fingerprint detection condition can read the ridge/valley information of the fingerprint without fail. For example, it is preferable that the data line 37 be wired in a place that the near-center part of a fingertip (an inspecting object) approaches. When the fingertip comes close to the fingerprint detection part 30, it is thought that the place which the center of a fingertip approaches is about the center of the fingerprint detection part 30; therefore, it is preferable that the (m/2)th wired data line 37 located in the center of the m data lines 37 be selected as the specific data line 37.

Further, in the above-described composition, the adjustment control circuit 12 is provided as the data line driver 10 in addition to an ordinary composition using a shift register 11; however, other compositions such as one with a decoder which can select an individual data line 37 using a digital code signal may be employed. Furthermore, the data line 37 used in the search for the fingerprint detection condition is not limited to the (m/2)th wired data line 37 located in the center of the m data lines 37 but may be any data line 37 that can read the ridge/valley information of a fingerprint. In addition, the number of the data lines 37 used in the search for the fingerprint detection condition does not have to be one but may be more than one.

Figure 9:
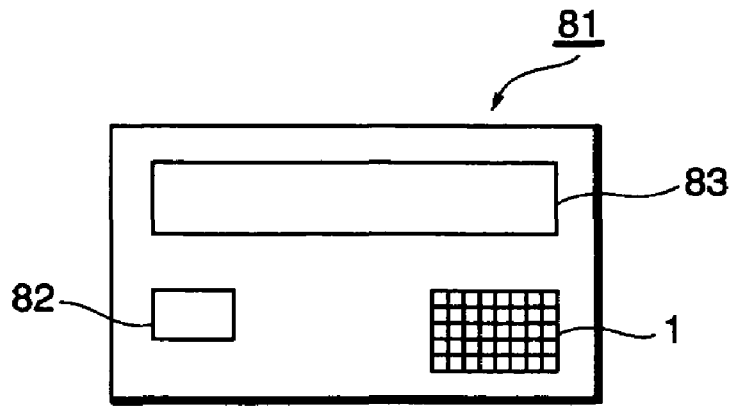
FIG. 9 is a diagram showing a composition of a smartcard.
Figure 10:
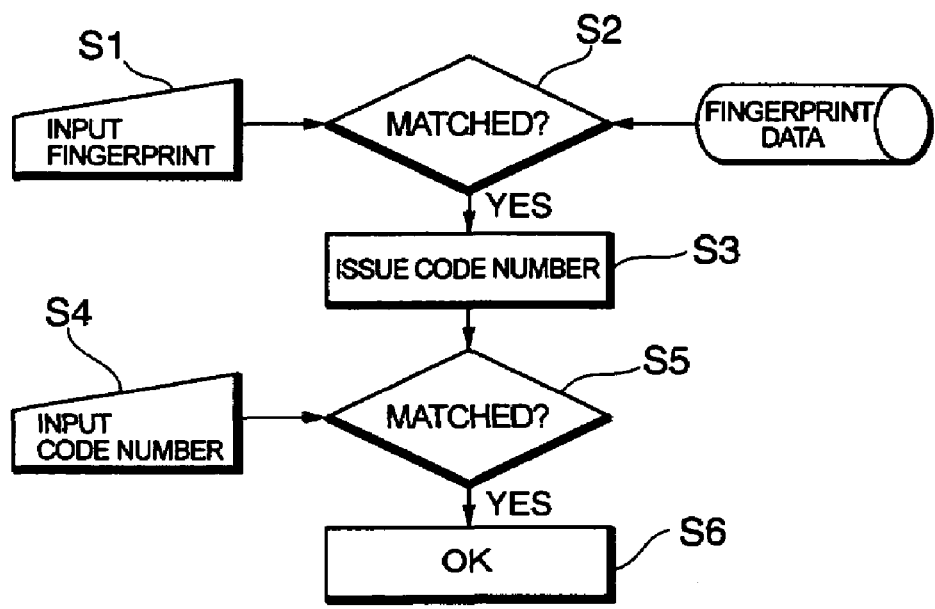
FIG. 10 is a flow chart describing an authentication procedure.

Now, an application example of a fingerprint sensor 1 will be described. FIG. 9 is a diagram outlining a smartcard 81, which includes the above-described fingerprint sensor 1, an IC chip 82 mounting a CPU and a memory element, and a display device 83 such as a liquid-crystal display. In the IC chip 82, fingerprint information of a cardholder as his or her biometric information is registered. FIG. 10 shows an authentication procedure of this smartcard 81. As a card user touches the fingerprint sensor 1 with his or her fingertip, the fingerprint information is input into the smartcard 81 (step S1) so as to be compared with the pre-registered fingerprint information (step S2). Here, if the fingerprints match (step S2; YES), a code number is issued (step S3). Then, a code number is input by the cardholder (step S4). The code number issued in step S3 and the code number input in step S4 are then checked to see if they match (step S5), and if they match (step S5; YES), the card is allowed for use (step S6).

As thus shown, by authenticating a user by using his or her code number and fingerprint information, a high-security smartcard can be provided. The smartcard having the biometric authentication function can be used for a cash card (bank card), a credit card, and an ID card. The fingerprint sensor of the present embodiment may be applied to any biometric authentication device for authenticating the user. For example, it can be applied to a security system for controlling the entering and exiting of a room, in which the fingerprint sensor of the present embodiment is installed at the door so as to compare the fingerprint information of the in-corner input into the present fingerprint sensor with the pre-registered fingerprint information, and, if they match, the entry is allowed, while if not, the entry is prohibited. Also, the fingerprint sensor can be applied to a system for reporting to a security company when necessary. Additionally, the fingerprint sensor of the exemplary embodiment as a biometric authentication device for authenticating the user can also be effectively applied to electronic commerce conducted through an open network, such as the Internet. Further, a wide range of applications are also possible in a user authentication device used for a computer terminal apparatus and in a control device of a photocopier for controlling the photocopier user, for example. Moreover, the capacitance detection device of the invention can be applied not only to fingerprint detection, but also to a device for reading a surface form of an inspecting object having minute unevenness on the surface as a change in capacitance.

In the exemplary embodiment, the search for the fingerprint detection condition can be carried out in a short period of time, since it is not necessary to search all the n×m capacitance detection circuits 31 arranged in the fingerprint detection part 30 but needs only to search n capacitance detection circuits 31 connected with the specific data line 37 in order to obtain the optimal fingerprint detection condition. Consequently, it is possible to reduce the total time required for the fingerprint detection including the time to search for the fingerprint detection condition, whereby high-speed sensing and low electric consumption become possible. However, in order to reduce the time required for preparation for search for the fingerprint detection condition, it is necessary that the driving speed of the scanning line driver 20 be as high as that of the data line driver 10 (to be described in detail later).

Figure 11:
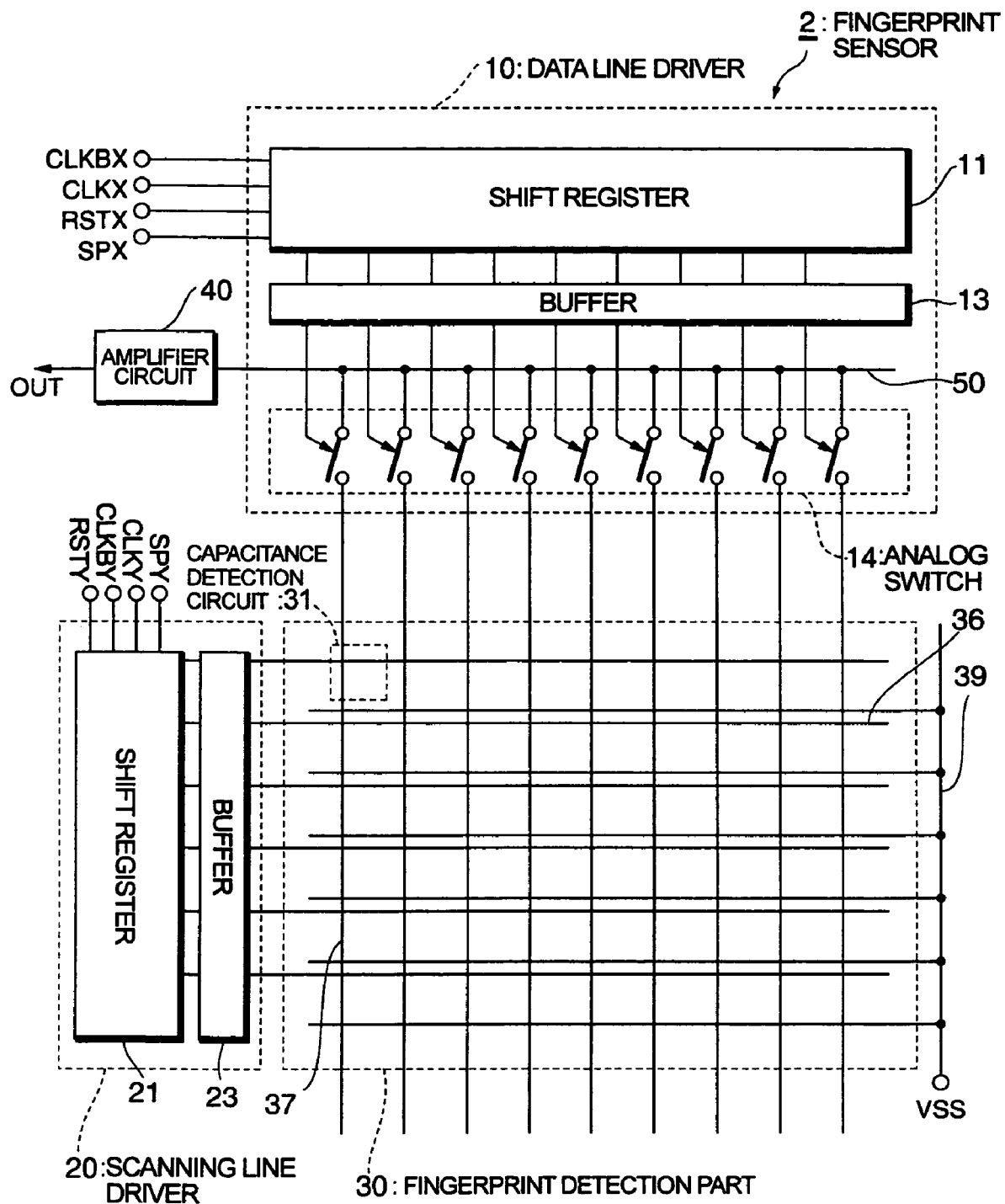
FIG. 11 is a diagram showing a circuit diagram of a fingerprint sensor of a second exemplary embodiment.
Figure 12:
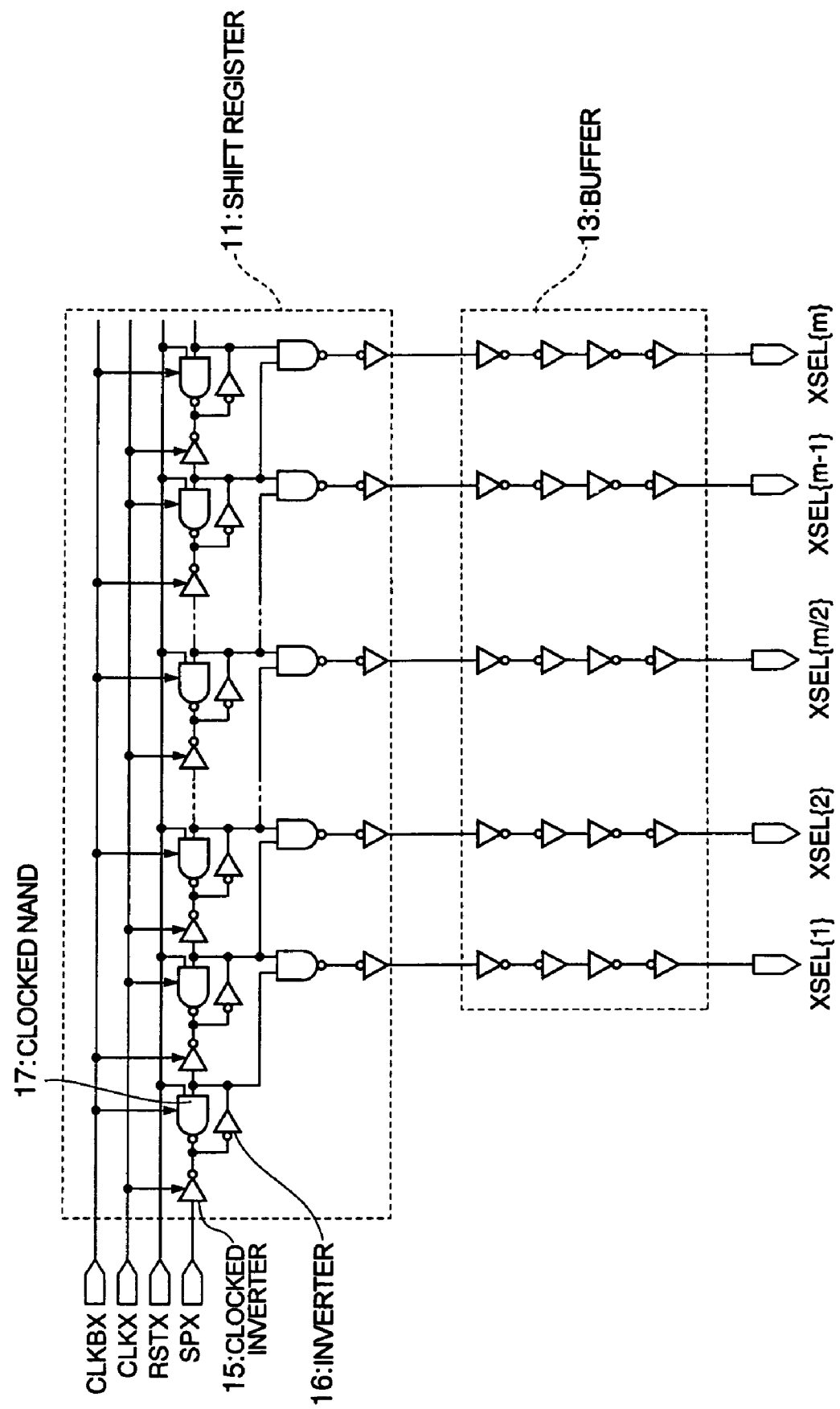
FIG. 12 is a diagram showing an exemplary circuit diagram of a data line driver.

In the following, the fingerprint sensor of the second exemplary embodiment of the invention is described. FIG. 11 shows an exemplary circuit diagram of a fingerprint sensor 2 of the embodiment. Reference numbers in this diagram indicate the same circuits and the like as the reference numbers used in FIG. 1, therefore, detailed descriptions thereof are omitted. Unlike in the first exemplary embodiment as described above, the adjustment control circuit 12 is not mounted in the data line driver 10 in the present embodiment. FIG. 12 shows a detailed circuit diagram of the data line driver 10. The above-described first embodiment is in a composition in that the specific data line 37 that goes active when searching for the fingerprint detection condition is selected by providing the adjustment control circuit 12; while, in the present embodiment, no special hardware such as the adjustment control circuit 12 is mounted and, instead, by devising the driving method of the data line driver 10, a specific data line 37 that goes active when searching for the fingerprint detection condition is selected.

Figure 13:
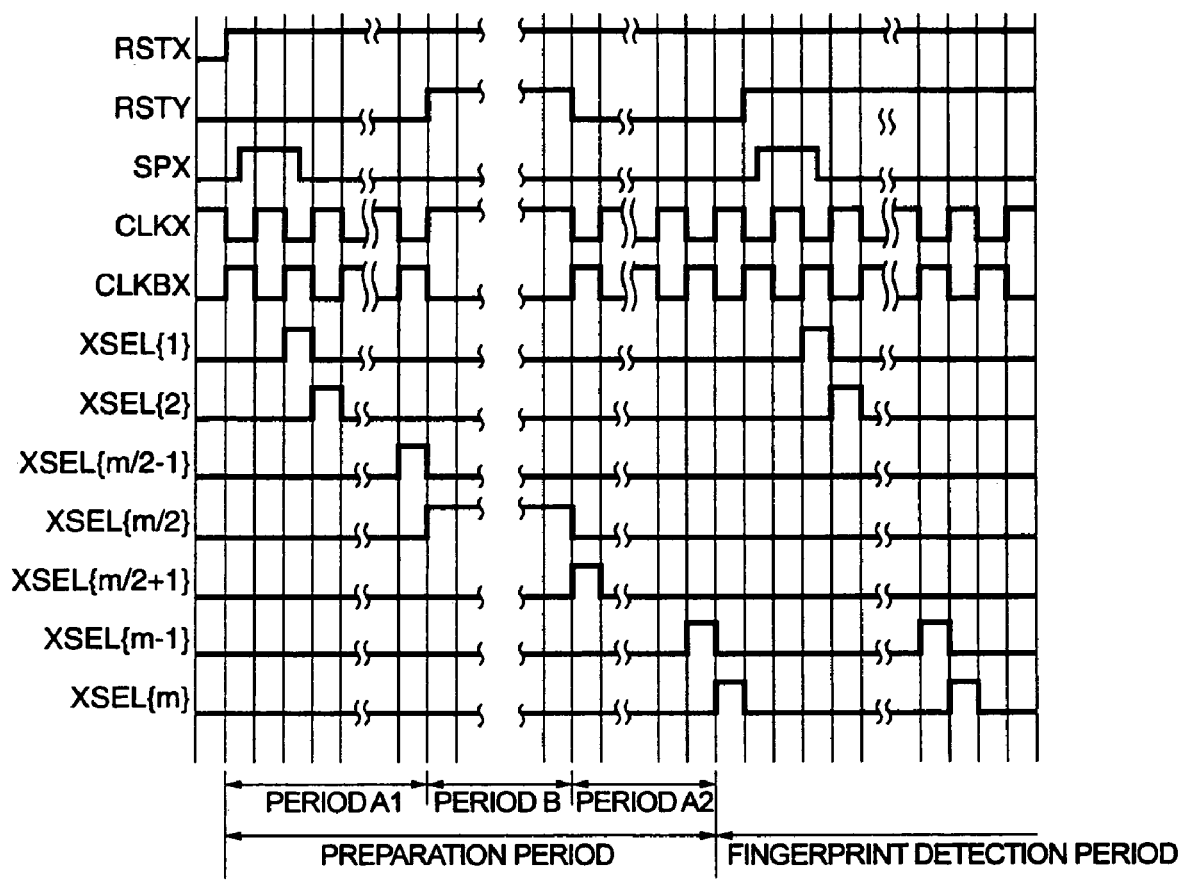
FIG. 13 is a timing diagram of the second exemplary embodiment.

FIG. 13 is a timing diagram illustrating the operation of the data line driver 10. As shown in the diagram, the reset signal RSTX is in high level in both the preparation period and the fingerprint detection period, and the data line driver 10 is in an operable state. When the start pulse SPX is input during the period to prepare for the search for a fingerprint detection condition, the data line driver 10 synchronizes with the clock signal CLKX and the inverted clock signal CLKBX, successively turning XSEL{1}, XSEL{2}, and so forth to active and successively selecting the data lines 37. Here, since the reset signal RSTY of the scanning line driver 20 is in low level, the scanning line driver 20 is stopped (period A1). Then, when XSEL{m/2} turns active, the clock signal CLKX and the inverted clock signal CLKBX are stopped. Here, only the specific (m/2)th wired data line 37 is in select state. Here, when the reset signal RSTY of the scanning line driver 20 is turned to high level, the scanning line driver 20 synchronizes with the clock signal CLKY and the inverted clock signal CLKBY, successively selecting the scanning lines 36 (period B).

By this successive selection of the scanning lines 36, n capacitance detection circuits 31 connected with the specific data line 37 are successively selected, whereby a current corresponding to the ridge/valley information of the fingerprint flows from the amplifier circuit 40 to each capacitance detection circuit 31. In period B, the reference 5potential VR is set to various values in the range of Vss to Vdd to obtain the detection signal OUT in order to search for an optimal reference potential VR. Upon finishing the search for the fingerprint detection condition, the reset signal RSTY of the scanning line driver 20 is turned to low level, while restarting inputting the clock signal CLKX and the inverted clock signal CLKBX into the data line driver 10 until the last mth data line 37 is selected (period A2), whereby the preparation period is finished. Additionally, the selection operation of the data lines 37 in period A2 is not necessarily essential, but, instead, the data line driver 10 may be reset at the time when the search for the fingerprint detection condition in period B is finished.

According to the present exemplary embodiment, without mounting additional hardware, a specific data line 37 can be selected and an optimal fingerprint detection condition can be searched for by devising the driving method of the data line driver 10. Therefore, as it is possible in the first embodiment, it is possible with the present embodiment to optimize the fingerprint detection condition in a short period of time, whereby high-speed sensing and low electric consumption using the fingerprint sensor 2 become possible. However, in order to reduce the time required for the preparation period in search for the fingerprint detection condition, it is necessary that the driving speed of the scanning line driver 20 be as high as that of the data line driver 10 (to be described in detail below).

Figure 14:
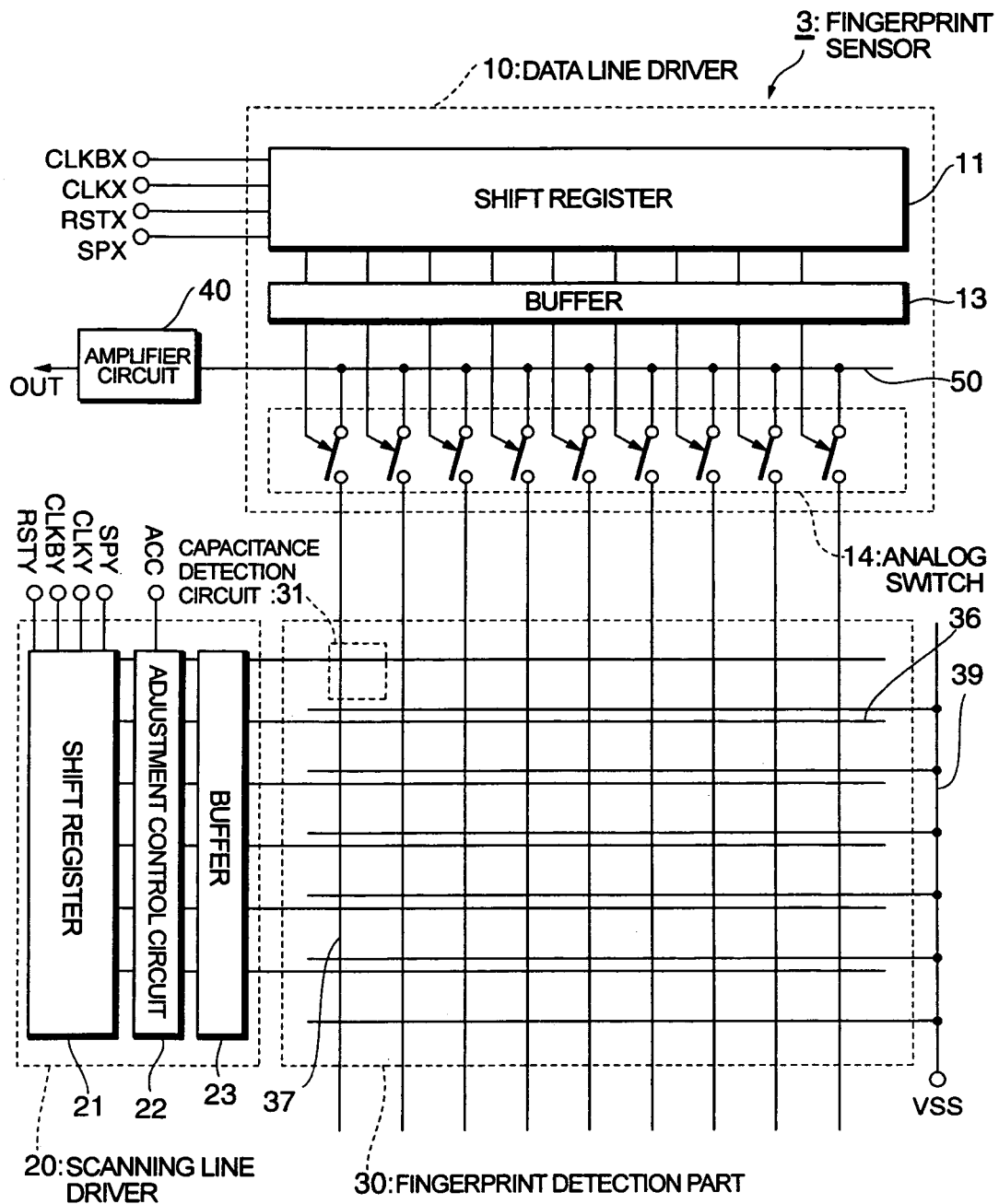
FIG. 14 is a diagram showing a circuit diagram of a fingerprint sensor of a third exemplary embodiment.
Figure 15:
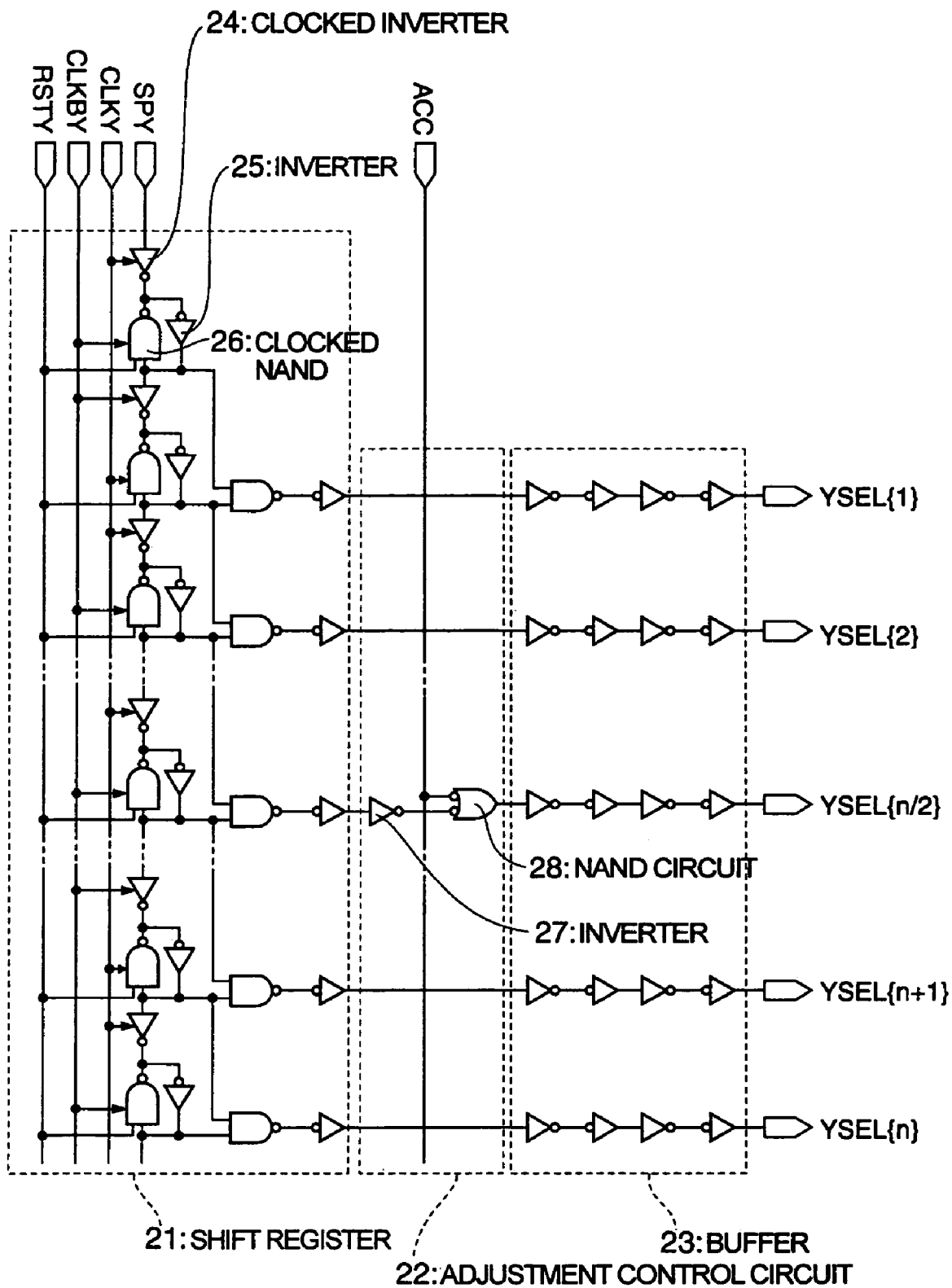
FIG. 15 is a diagram showing an exemplary circuit diagram of a scanning line driver.

In the following, the fingerprint sensor of the third exemplary embodiment of the invention is described. FIG. 14 shows a circuit diagram of a fingerprint sensor 3 of the present embodiment. Reference numbers in this diagram indicate the same circuits and the like as the reference numbers used in FIG. 1, therefore, detailed descriptions thereof are omitted. Unlike in the first embodiment as previously described, the adjustment control circuit 22 is mounted in the scanning line driver 20 in the present embodiment. The adjustment control circuit 22 is composed so that only a specific scanning line 36 is selected during the search for the fingerprint detection condition, operating as a selection means for selecting the specific scanning line 36. FIG. 15 shows a detailed circuit diagram of the scanning line driver 20. As shown in this diagram, the shift register 21 is composed of the clocked inverter 24 which controls the receiving of a pulse signal which is input from a stage preceding the shift resistor, the inverter 25 which inverts the output of the clocked inverter 24, and the clocked NAND circuit 26 which controls the inversion of the output (to a stage subsequent to the shift resistor). The adjustment control circuit 22 is composed of an inverter 27 for inverting the output from the shift register 21 and of a NAND circuit 28 which takes the NAND of the output signal of the inverter 27 and the adjustment control signal Acc and then outputs the signal to the subsequent buffer 23. From YSEL{1} to YSEL{n} are buffer outputs for driving the n scanning lines 36.

Figure 16:
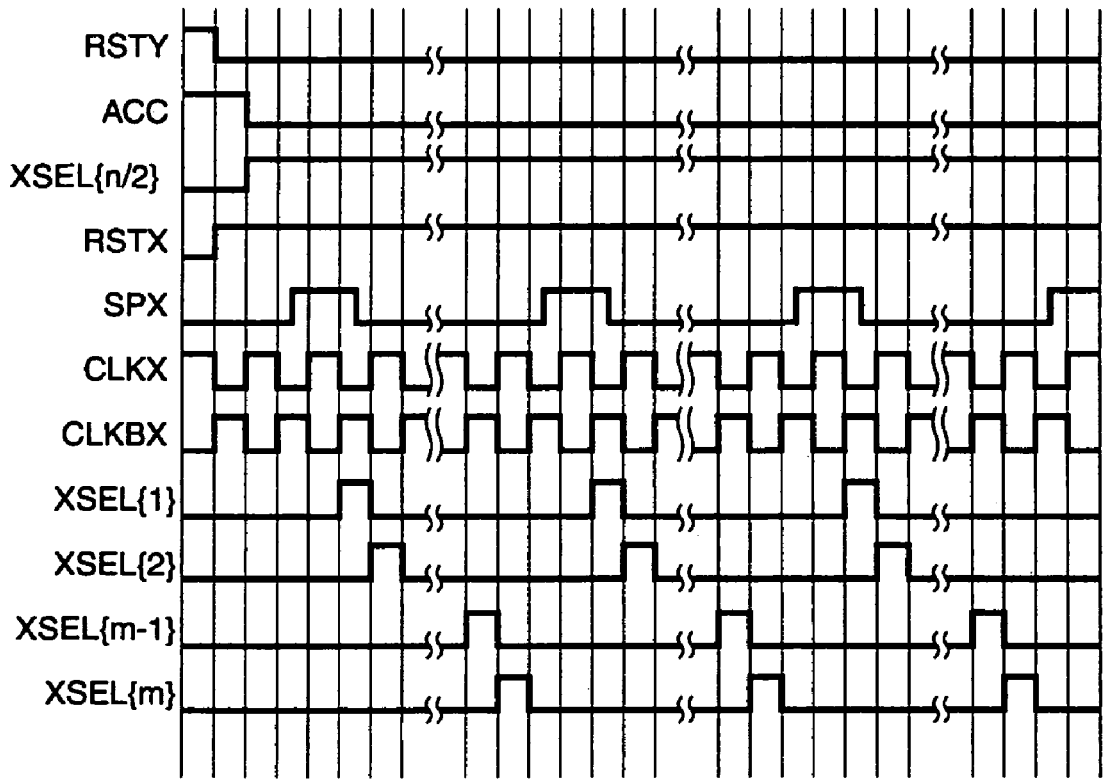
FIG. 16 is a timing diagram of a third exemplary embodiment.

FIG. 16 illustrates a timing diagram in the period for preparation for the search for the fingerprint detection condition. During the preparation period, the reset signal RSTY of the scanning line driver 20 is turned to low level. Consequently, all the outputs of the clocked NAND circuit 26 included in the shift resistor 21 which composes the scanning line driver 20 turn to high level, and all the outputs of the shift resistor 21 in every stage turn to low level. Here, when the adjustment control signal ACC is turned to low level, only the buffer output (in FIG. 15, YSEL{n/2}) in the stage where the NAND circuit 28 is provided turns to high level, whereby the corresponding specific scanning line 36 turns to select state. Other scanning lines 36 are in non-select state. On the other hand, as regards the data line driver 10, the reset signal RSTX is turned to high level, and the data line 37 is successively selected in synchronization with the clock signal CLKX and the inverted clock signal CLKBX. This diagram shows a case in which the start pulse SPX is input three times, which means that the above-described specific scanning line 36 is scanned three times. In one scanning, a current which corresponds to the ridge/valley information of a fingerprint flows in m capacitance detection circuits 31 that are connected with the specific scanning line 36. Per each scanning, the fingerprint detection operation is conducted under various detection conditions in order to search for an optimal fingerprint detection condition. A method for searching for the fingerprint detection condition is as described earlier.

Additionally, it is preferable that the scanning line 36 selected at the time of searching for the fingerprint detection condition can read the ridge/valley information of the fingerprint without fail. For example, it is preferable that the scanning line 36 be arranged at a position where the near-center part of a fingertip (the inspecting object) approaches the fingerprint detection part 30. When a fingertip comes close to the fingerprint detection part 30, the place at which the center of a fingertip approaches is about the center of the fingerprint detection part 30, therefore, it is preferable that the (n/2)th wired scanning line 36 located in the center of the n scanning lines 36 be the specific scanning line 36.

Further, in the above-described composition, the adjustment control circuit 22 is provided as the scanning line driver 20 in addition to an ordinary composition using a shift resistor 21, however, other compositions such as one with a decoder which can select an individual scanning line 36 using a digital code signal may be employed. Furthermore, the scanning line 36 used when searching for the fingerprint detection condition is not limited to the (n/2)th wired scanning line 36 in the center of the n scanning lines 36, but may be any scanning line 36 that can read the ridge/valley information of a fingerprint. In addition, the number of the scanning lines 36 used when searching for the fingerprint detection condition does not have to be one but may be more than one.

In the embodiment, the search for the fingerprint detection condition can be carried out in a short period of time, since it is not necessary to search all the n×m capacitance detection circuits 31 arranged in the fingerprint detection part 30 but needs only to search m capacitance detection circuits 31 that are connected with the specific scanning line 36 in order to obtain the optimal fingerprint detection condition. Consequently, it is possible to reduce the total time required for the fingerprint detection including the time to search for the fingerprint detection condition, whereby high-speed sensing and low electric consumption become possible.

In addition, if in the first and second embodiments described above, the speed at which the scanning line driver 20 is driven in the preparation period to search for a fingerprint detection condition is the same as the speed at which a fingerprint information is read in an ordinary manner, then the time required for preparation becomes the same as the time required for reading the fingerprint in an ordinary manner. Consequently, it becomes impossible to make the time of the preparation period shorter than the time required in a conventional manner in which all the n×m capacitance detection circuits 31 arranged in the fingerprint detection part 30 are used in order to search for the fingerprint detection condition. On the contrary, according to the present embodiment, these problems do not occur, since the preparation period can be shorter than the conventionally required time by merely matching the driving speed of the data line driver 10 during the preparation period with the speed at which the fingerprint information is read in an ordinary manner.

More detailed description of this aspect is as follows. For example, suppose that 100×100 capacitance detection circuits 31 are arranged in the fingerprint detection part 30 (m=100, n=100). If the time required for reading information from one capacitance detection circuit 31 is 1 μs, the time to read one frame will be 100×100×1 μs=10 ms. Then, when reading the fingerprint information in an ordinary manner, the driving speed of the data line driver 10 is 500 kHz, while the driving speed of the scanning line driver is 1/m=1/100 of 500 kHz; that is, 5 kHz. Therefore, if, in the preparation period, the driving speeds of the data line driver 10 and the scanning line driver 20 are the same as the speed at which a fingerprint information is commonly read, then, the time required for the preparation period in the third embodiment, in which the fingerprint detection condition is searched for by driving the data line driver 10, is 1/100 of what is required for the preparation period in the first or second embodiment in which the fingerprint detection condition is searched for by driving the scanning line driver 20. Thus, in the present embodiment, the requirement specification level can remain low, and cost reduction is possible since there is no need to improve the driving capacity of the scanning line driver 20 during the preparation period.

Next, the fingerprint sensor of the fourth exemplary embodiment of the present invention is described. Since the circuit diagram of the fingerprint sensor of the present embodiment is the same as the fingerprint sensor 2 of the second embodiment, the diagram is omitted for the convenience of description. The above-described third embodiment has a composition in which the adjustment control circuit 22 is provided so as to select the specific scanning line 36 which turns active when searching for the fingerprint detection condition. In the present embodiment, however, without mounting any special hardware such as the adjustment control circuit 22 but by devising the method for driving the scanning line driver 20, the specific scanning line 36 that turns active when searching for the fingerprint detection condition is selected.

Figure 17:
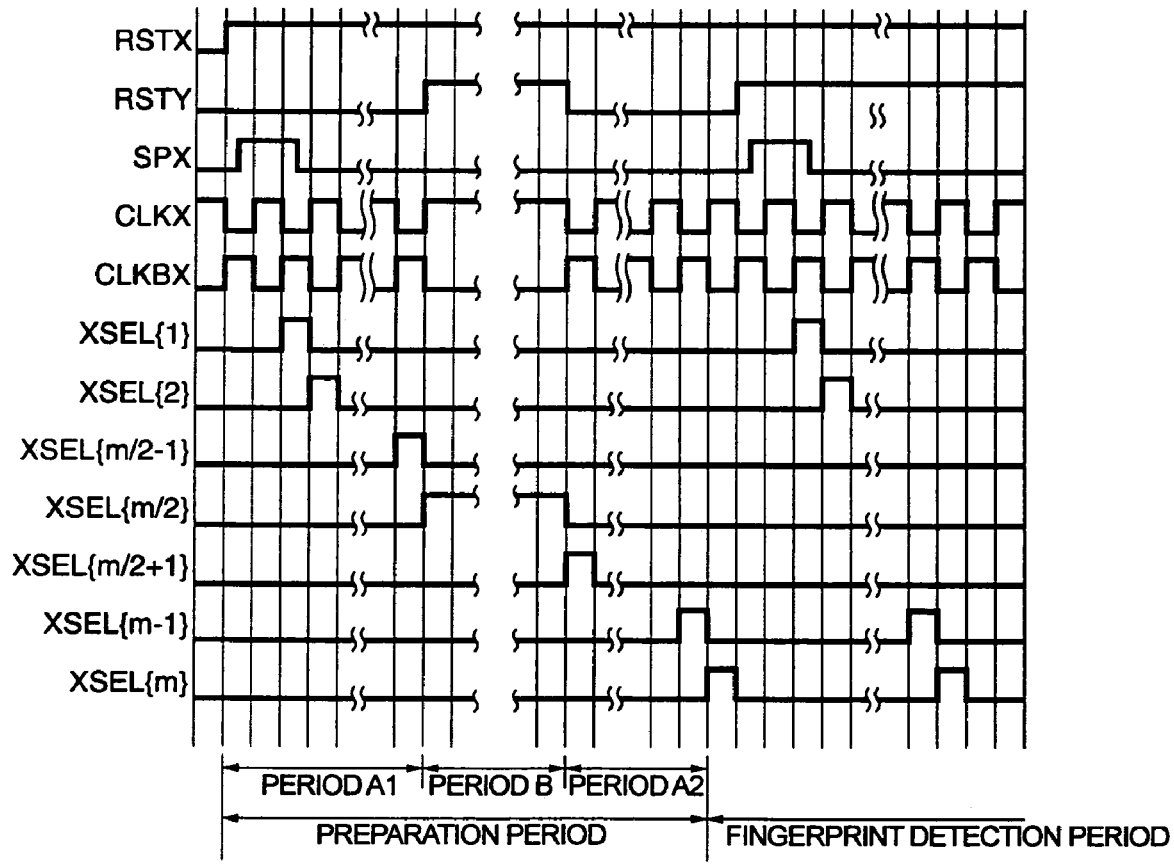
FIG. 17 is a timing diagram of a fourth exemplary embodiment.

FIG. 17 is a timing diagram illustrating the operation of the scanning line driver 20. In the preparation period in which the fingerprint detection condition is searched for, the reset signal RSTY of the scanning line driver 20 is in high level. When the start pulse SPY is input in the preparation period for the search of a fingerprint detection condition, the scanning line driver 20 synchronizes with the clock signal CLKY and the inverted clock signal CLKBY, successively turning YSEL{1}, YSEL{2}, and so forth to active and then successively selecting the scanning lines 36. Here, since the reset signal RSTX of the data line driver 10 is in low level, the data line driver 10 is stopped (period A1). Then, when YSEL{n/2} turns active, the clock signal CLKY and the inverted clock signal CLKBY are stopped. Here, only the specific (n/2)th wired scanning line 36 is in select state. Here, when the reset signal RSTX of the data line driver 10 is turned to high level, the data line driver 10 synchronizes with the clock signal CLKX and the inverted clock signal CLKBX, successively selecting the data lines 37 (period B). By this successive selection of the data lines 37, m capacitance detection circuits 31 connected with the specific scanning line 36 are successively selected, whereby a current corresponding to the ridge/valley information of the fingerprint flows from the amplifier circuit 40 to each respective capacitance detection circuit 31.

In period B, the reference potential VR is set to various values in the range of Vss to Vdd to obtain the detection signal OUT in order to search for an optimal reference potential VR. Upon finishing the search for the fingerprint detection condition, the reset signal RSTX of the data line driver 10 is turned to low level, while restarting inputting the clock signal CLKY and the inverted clock signal CLKBY into the scanning line driver 20 until the last nth scanning line 36 is selected (period A2), whereby the preparation period is finished. Additionally, the selection operation of the scanning lines 36 in period A2 is not necessarily essential, but, instead, the scanning line driver 20 may be reset at the time when the search for the fingerprint detection condition in period B is finished.

According to the exemplary embodiment, the specific scanning line 36 is selected and an optimal fingerprint detection condition can be searched for without mounting additional hardware but by devising the driving method of the scanning line driver 20. Therefore, as it is possible in the third embodiment, it is possible with the present embodiment to optimize the fingerprint detection condition in a short period of time, whereby high-speed sensing and low electric consumption become possible.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A capacitance detection device, comprising:
a fingerprint detecting part including a plurality of data lines, a plurality of scanning lines, and a plurality of capacitance detector circuits positioned at a plurality of intersections between the plurality of data lines and the plurality of scanning lines;
a data line driver electrically connected to the plurality of data lines, the data line driver including a first shift register and an adjustment control circuit, the data line driver being configured to select one line of the plurality of data lines by the adjustment control circuit; and
a scanning line driver electrically connected to the plurality of scanning lines, the scanning line driver including a second shift register, the scanning line driver being configured to select the plurality of scanning lines during the one line of the plurality of data lines being selected.

2. The capacitance detection device according to claim 1, the adjustment control circuit including:
an inverter;
a signal line; and
a NAND configured to receive a first signal from the inverter and a second signal from the signal line, the NAND being configured to output a third signal to control the one line of the plurality of data lines.

3. The capacitance detection device according to claim 1, the first shift register being configured to control all the plurality of data lines and the adjustment control circuit being configured to control only the one line of the plurality of data lines.

4. The capacitance detection device according to claim 2, the data line driver further including a first buffer, the adjustment control circuit being positioned between the first shift register and the fingerprint detecting part, the first buffer being positioned between the adjustment control circuit and the fingerprint detecting part.

5. The capacitance detection device according to claim 3, the scanning line driver further inducing a second buffer, the second buffer being positioned between the second shift register and the fingerprint detecting part.

6. The capacitance detection device according to claim 1, further comprising:
an amplifier circuit electrically connected to the plurality of data lines via a plurality of switches to supply the plurality of data lines a reference potential, the amplifier circuit being configured to control the reference potential to be set to various values.

7. The capacitance detection device according to claim 6, the amplifier circuit being configured to control the reference potential to be set to various values during the data line driver selecting one line of the plurality of data lines by the adjustment control circuit.

8. The capacitance detection device according to claim 1, the scanning line driver being configured to select the plurality of scanning lines sequentially during the one line of the plurality of data lines being selected.

9. The capacitance detection device according to claim 1, the scanning line driver being configured to select the plurality of scanning lines more than two times during the one line of the plurality of data lines being selected.

10. The capacitance detection device according to claim 1, the data line driver being configured to select the one line of the plurality of data lines by the adjustment control circuit during a preparation period and the scanning line driver being configured to select the plurality of scanning lines during the preparation period.

11. The capacitance detection device according to claim 10, the data line driver being configured to select the plurality of data lines by the first shift register during a fingerprint detection period and the scanning line driver being configured to select the plurality of scanning lines during the fingerprint detection period.

12. A fingerprint sensor, comprising:
the capacitance detection device according to claim 1, the plurality of capacitance detector circuits being worked as a sensor so as to read ridge/valley information of a fingerprint.

13. A biometric authentication device comprising:
the fingerprint sensor according to claim 12.

14. A capacitance detection device, comprising:
a fingerprint detecting part including a plurality of data lines, a plurality of scanning lines, and a plurality of capacitance detector circuits positioned at a plurality of intersections between the plurality of data lines and the plurality of scanning lines;
a data line driver electrically connected to the plurality of data lines, the data line driver including a first shift register, the data line driver being configured to select one line of the plurality of data lines during a preparation period, the data line driver being configured to select the plurality of data lines during a fingerprint detection period; and
a scanning line driver electrically connected to the plurality of scanning lines, the scanning line driver including a second shift register, the scanning line driver being configured to select the plurality of scanning lines during the preparation period, the scanning line driver being configured to select the plurality of scanning lines during the fingerprint detection period.

15. The capacitance detection device according to claim 12, further comprising:
an amplifier circuit electrically connected to the plurality of data lines via a plurality of switches to supply the plurality of data lines a reference potential, the amplifier circuit being configured to control the reference potential to be set to various values during the preparation period.

16. A fingerprint sensor comprising:
the capacitance detection device according to claim 14, the plurality of capacitance detector circuits being worked as a sensor so as to read ridge/valley information of a fingerprint.

17. A biometric authentication device comprising:
the fingerprint sensor according to claim 16.

18. A capacitance detection device, comprising:
a fingerprint detecting part including a plurality of data lines, a plurality of scanning lines, and a plurality of capacitance detector circuits positioned at a plurality of intersections between the plurality of data lines and the plurality of scanning lines;
a data line driver electrically connected to the plurality of data lines, the data line driver including a first shift register, the data line driver being configured to select one line of the plurality of data lines during a preparation period;
a scanning line driver electrically connected to the plurality of scanning lines, the scanning line driver including a second shift register, the scanning line driver being configured to select the plurality of scanning lines during the preparation period; and
an amplifier circuit electrically connected to the plurality of data lines via a plurality of switches to supply the plurality of data lines a reference potential, the amplifier circuit being configured to control the reference potential to be set to various values during the preparation period.

* * * * *